2,889,139

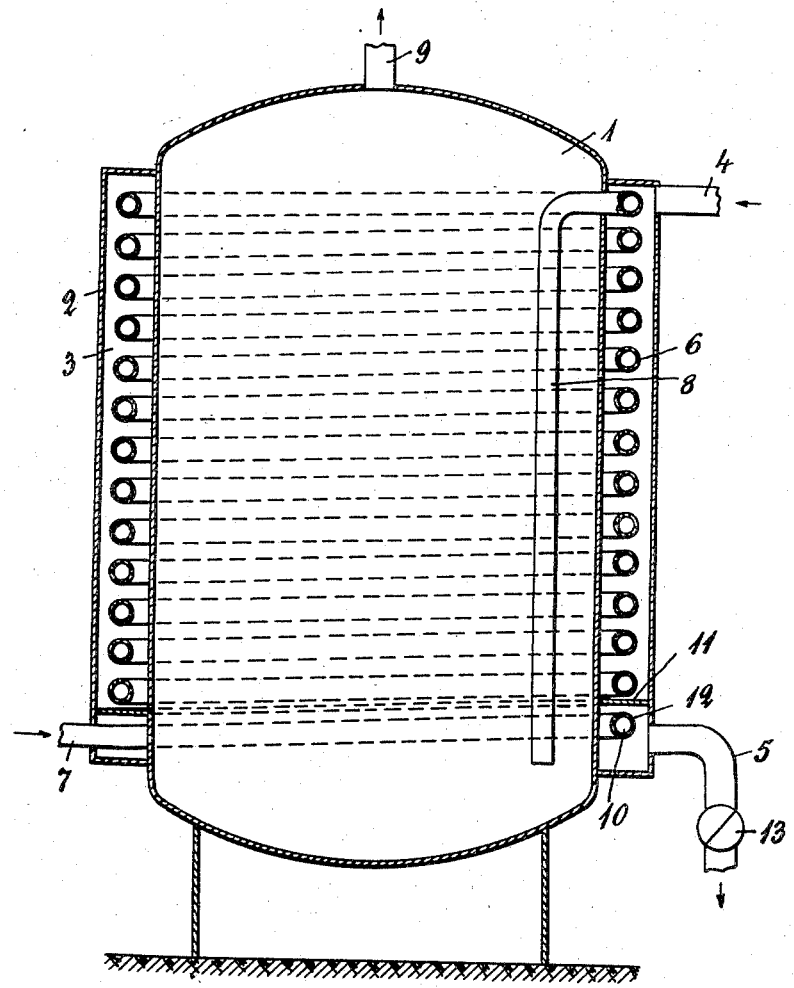

WATER HEATERS

Axel Henrik Hedberg, Djursholm, Sweden, assignor to Aktiebolaget Thermia-Verken, Arvika, Sweden, a corporation of Sweden Application January 11, 1955, Serial No. 481,199

3 Claims. (Cl. 257—32)

In conventional steam-heated water heaters the consumption hot water for domestic purposes is heated either by means of a pipe coil or a pipe battery disposed in the water storage tank, or, in double-walled heaters, through the wall surface. It is well-known that the heat transfer coefficient of condensing steam is very high, but this circumstance is not utilized in a satisfactory manner in existing constructions. Due to the low heat transfer coefficient obtained in convective or laminary flow of water, the rate of heat transmission is very low. Thus, the situation is similar to that obtaining in hot-water-heated water-heaters in which the consumption water flows through the pipes of the heating battery at a high velocity. In spite of the fact that the heat transfer coefficient within the pipes may be high, the rate of heat transmission (the $k$ value) is low unless the water from the boiler is conducted through suitably constructed passages and at a high velocity over the pipes of the heating battery.

The object of the present invention is to provide a highly efficient steam-heated water-heater of the storage type, comprising a storage tank and an outer wall around at least a portion thereof so as to form an annular passage for the steam. The invention is characterized in that the inlet for the entering cold consumption water communicates with a pipe coil, which is helically disposed in said passage and serves as a preheating unit for the consumption hot water, the lower portion of said passage accommodating a condensate cooling unit, formed by one or more of the lower convolutions of the helical pipe coil and a helically disposed partition associated therewith to form a water-cooled passage of constricted area of flow. By forming a condensate cooling portion in this manner in the lower portion of the steam passage the result is achieved that it is possible in a simple manner and with practically no increase in the cost of the installation to avoid such revaporization losses in condensate conduits and condensate collecting tanks as often occur in steam installations and simultaneously a saving in fuel of up to about 25% is obtained.

The invention will be further explained below with reference to the embodiment shown diagrammatically and in vertical cross-section on the accompanying drawing.

Referring to the drawing, the illustrated water-heater comprises a standing cylindrical storage tank the wall of which is surrounded by a jacket 2 spaced from said wall to form a passage 3 for the heating medium in the present case steam. The inlet 4 of said passage is located at the top portion thereof and its outlet 5 near its bottom.

The consumption water to be heated in said water-heater is introduced into the storage tank through a preheater formed by a helical pipe coil 6 disposed in the passage 3. The inlet 7 of the coil 6 is disposed at the bottom of the water-heater and the coil 6 terminates within the tank 1 with a vertical pipe portion 8 extending within the tank 1 to a point adjacent the bottom thereof.

The consumption water is withdrawn in the usual manner through an outlet 9 at the top of the tank 1.

In accordance with this invention the passage 3 includes a condensate cooling portion formed by one or more (in the present case one) of the lower convolutions 10 of the helical pipe coil 6 and a helically disposed partition 11 associated therewith. The partition 11 is so arranged that the water-cooled passage 12 formed thereby has a relatively small area of flow, which furthers condensation of the steam and cooling of the condensate. The condensate is withdrawn through outlet 5 which in a well-known manner may include a condensate separator 13.

In the embodiment illustrated on the drawing the water flowing from the cold water supply to the storage tank 1 first passes through the preheater pipe coil 6. When flowing through the pipe coil the cold-water obtains a considerable increase in temperature on account of the high heat transfer coefficient on the outer side of the coil (condensing steam) and the high heat transmission rate through the wall. From the pipe coil 6 the water is discharged into the bottom of the storage tank 1 wherefrom it is withdrawn through the outlet 9. When passing through the container 1 the water is further heated via the container wall. By the condensate cooling portion 10, 11, 12 arranged in accordance with this invention the condensate heat is utilized to the highest possible extent, whereby the water heater is highly efficient and economical in operation.

The invention is, of course, not limited to the embodiment shown and described but may be varied in many ways within the scope of the claims.

Having now particularly described the nature of my invention and the manner of the operation what I claim is:

1. A domestic hot water heater of the storage type employing live steam as a heating medium comprising, in combination, an upright water storage tank, a jacket encompassing said tank defining an annular passage for steam along the length of said tank, said jacket having closed ends at the upper and lower extremities thereof, said upper end defining an inlet for admitting steam into the interior of said jacket, said lower end of said jacket defining an outlet for discharging steam outwardly from the interior of said jacket, a tubular helical coil within said passage concentric with the longitudinal axis of said tank, a cold water inlet at one lower end of said coil extending through said jacket for connection to a cold water source, a cold water outlet at the opposite upper end of said coil emptying into the interior of said tank for secondary heating of the water passing from said coil into the tank, a steam condenser within said passage adjacent to the lower end of said jacket, said condenser including a helical partition wall in said passage defining a bottom chamber having a constricted opening communicating with said passage, said helical wall having a pitch corresponding to the pitch of said coil, and said coil having a winding within said chamber for condensing the steam flowing through said chamber.

2. A domestic hot water heater of the storage type employing live steam as heating medium, comprising an upright water storage tank, a jacket for said tank forming an annular passage for the steam along the length of said tank, said jacket being closed at both ends and having near its top an inlet for the admission of steam and near its bottom an outlet, a preheater coil for the passage of the water to be heated helically disposed within said annular passage, said coil having a cold water inlet near the bottom of the jacket and an end portion extending into the tank from about the top of said annular passage to a point near the bottom of the tank for discharging water from the coil into the tank for secondary heating of the water in the tank, said tank having a hot water discharge outlet at its upper end, and a steam condenser disposed in said passage at the bottom thereof, said condenser including a helical partition wall of substantially the same pitch as said coil in said annular passage forming therein a small bottom chamber communicating with the major portion of the annular passage through a constricted flow opening, said condenser including said cold water inlet and at least one winding of said coil for rapidly condensing steam flowing through said chamber by the cooling effect of the cold water entering said inlet, the condensate being discharged through said bottom chamber.

3. A hot water heater according to claim 2, wherein a conduit is connected to the bottom chamber outlet, and a condensate separator is included in said conduit.

References Cited in the file of this patent
UNITED STATES PATENTS

| | | |
|---|---|---|
| 859,352 | Unglaub | July 9, 1907 |
| 1,769,265 | Labus | July 1, 1930 |
| 2,223,311 | Berkeley et al. | Nov. 26, 1940 |
| 2,666,625 | Byerley | Jan. 19, 1954 |
| 2,753,954 | Tinker | July 10, 1956 |